(12) United States Patent
Abeling et al.

(10) Patent No.: US 11,087,618 B2
(45) Date of Patent: Aug. 10, 2021

(54) METHOD FOR DETECTING ILLEGALLY PARKED VEHICLES

(71) Applicant: Robert Bosch GmbH, Stuttgart (DE)

(72) Inventors: Peter Christian Abeling, Hannover (DE); Philipp Mayer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 291 days.

(21) Appl. No.: 16/061,625

(22) PCT Filed: Nov. 22, 2016

(86) PCT No.: PCT/EP2016/078468
§ 371 (c)(1),
(2) Date: Jun. 12, 2018

(87) PCT Pub. No.: WO2017/102267
PCT Pub. Date: Jun. 22, 2017

(65) Prior Publication Data
US 2020/0265713 A1  Aug. 20, 2020

(30) Foreign Application Priority Data

Dec. 16, 2015  (DE) .................. 102015225413.5

(51) Int. Cl.
*G08G 1/017*  (2006.01)
*G06K 9/00*  (2006.01)
(Continued)

(52) U.S. Cl.
CPC ....... *G08G 1/0175* (2013.01); *G06K 9/00812* (2013.01); *G06K 9/00825* (2013.01);
(Continued)

(58) Field of Classification Search
CPC ...... G08G 1/0175; G08G 1/147; G08G 1/127; G08G 1/09626; G08G 1/143;
(Continued)

(56) References Cited

U.S. PATENT DOCUMENTS

2013/0021171 A1   1/2013  Hsu et al.
2013/0147954 A1*  6/2013  Song ................... G08G 1/04
                                             348/148
(Continued)

FOREIGN PATENT DOCUMENTS

CN        1828689 A      9/2006
CN        1956024 A      5/2007
(Continued)

OTHER PUBLICATIONS

International Search Report dated Feb. 24, 2017 of the corresponding International Application PCT/EP2016/078468 filed Nov. 22, 2016.

*Primary Examiner* — Brian Wilson
(74) *Attorney, Agent, or Firm* — Norton Rose Fulbright US LLP; Gerard Messina

(57) ABSTRACT

A method for detecting illegally parked vehicles includes obtaining information, in the form of a digital parking map, about available parking areas and areas that are unavailable for parking, where the information about areas unavailable for parking includes coordinates, in particular GPS coordinates, and expected lengths of the areas. The length of an area that is unavailable for parking is detected by a parking space searching vehicle and an illegally parked vehicle is detected if the detected length deviates from an expected length.

14 Claims, 3 Drawing Sheets

(51) Int. Cl.
*G08G 1/01* (2006.01)
*G08G 1/0962* (2006.01)
*G08G 1/127* (2006.01)
*G08G 1/14* (2006.01)

(52) U.S. Cl.
CPC ....... *G08G 1/0112* (2013.01); *G08G 1/09626* (2013.01); *G08G 1/127* (2013.01); *G08G 1/143* (2013.01); *G08G 1/147* (2013.01); *G06K 2209/23* (2013.01)

(58) Field of Classification Search
CPC .... G08G 1/0112; G08G 1/04; G06K 9/00825; G06K 9/00812; G06K 2209/23
See application file for complete search history.

(56) References Cited

U.S. PATENT DOCUMENTS

| | | | | |
|---|---|---|---|---|
| 2013/0261958 A1* | 10/2013 | Herron | ................... | G08G 1/143 701/428 |
| 2013/0265419 A1 | 10/2013 | Bulan et al. | | |
| 2013/0266188 A1* | 10/2013 | Bulan | ................ | G06K 9/00771 382/104 |
| 2015/0206014 A1* | 7/2015 | Wu | ........................ | G08G 1/168 348/149 |

FOREIGN PATENT DOCUMENTS

| | | |
|---|---|---|
| CN | 101206799 A | 6/2008 |
| CN | 102426781 A | 4/2012 |
| CN | 103077612 A | 5/2013 |
| CN | 202975682 U | 6/2013 |
| CN | 103927878 A | 7/2014 |
| DE | 102004062021 A1 | 7/2006 |
| DE | 102008028550 A1 | 12/2009 |
| DE | 102009028024 A1 | 2/2011 |
| DE | 102013003683 A1 | 9/2014 |
| EP | 1792776 A2 | 6/2007 |
| JP | H022494 A | 1/1990 |
| JP | H04148298 A | 5/1992 |
| JP | 2010039825 A | 2/2010 |

\* cited by examiner

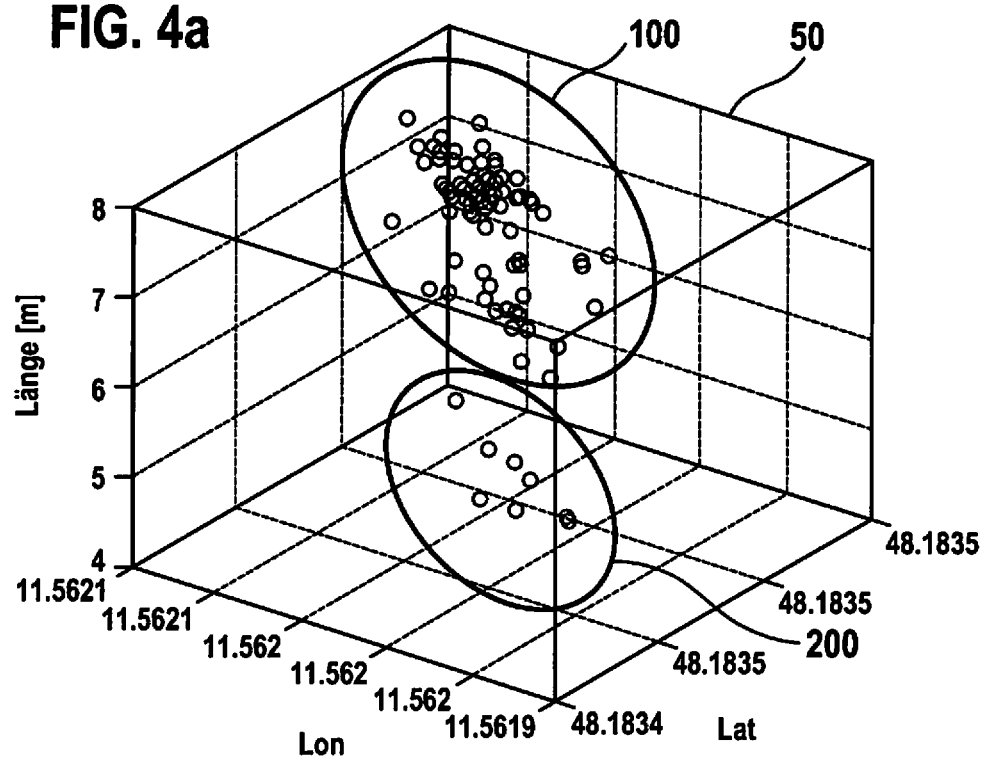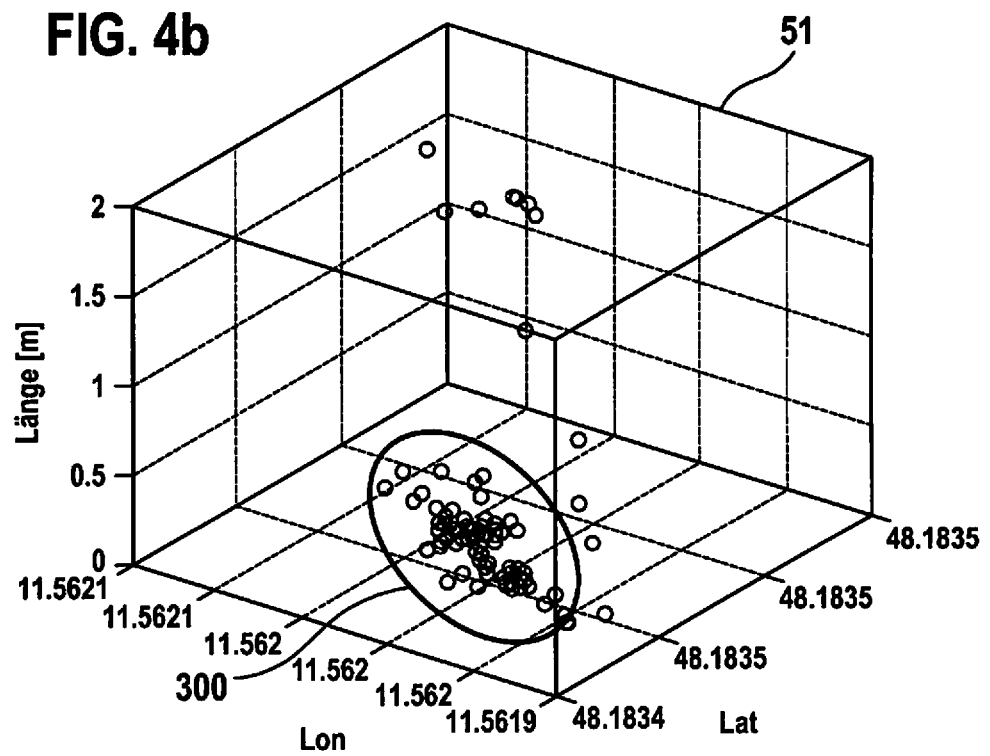

METHOD FOR DETECTING ILLEGALLY PARKED VEHICLES

CROSS-REFERENCE TO RELATED APPLICATIONS

The present application is the national stage of International Pat. App. No. PCT/EP2016/078468 filed Nov. 22, 2016, and claims priority under 35 U.S.C. § 119 to DE 10 2015 225 413.5, filed in the Federal Republic of Germany on Dec. 16, 2015, the content of each of which are incorporated herein by reference in their entireties.

FIELD OF THE INVENTION

The present invention relates to a method for detecting illegally parked vehicles parked for a certain period of time in areas in which permanent parking is not allowed (for example a courtyard entrance, a no parking zone, etc.). In this case, a digital parking map is used which contains information about parking areas and no parking areas.

BACKGROUND

Parking and driver assistance functions using distance-based measuring methods (for example ultrasonic sensors, radar) are known from the related art. Free parking spots can be measured with the aid of various sensors and offered to the driver as parking options, whereby a partially or fully automated parking assistance function assists the driver with parking into a free parking spot.

Transmitting free parking spots detected in such a manner to a server is also known from the related art, for example from DE 10 2004 062 021 A1, DE 10 2009 028 024 A1, and DE 10 2008 028 550 A1. Methods are further known which provide for the learning of parking maps in order to differentiate between entranceways and authorized parking areas from the transmitted free parking spot data. These methods use data from many different vehicles and drives through a street and are therefore usually implemented on a server.

DE 10 2013 003 683 A1 provides a driver assistance system for assisting a driver of a motor vehicle with categorizing a free area of a road network as a usable parking space with the aid of a surroundings detection system for detecting surroundings data and an evaluation means for evaluating the surroundings data. In this case, the evaluation means is designed and configured in such a way that it is ascertained on the basis of the surroundings data whether the area is situated in such a way that an actual use of the area as a parking space for the motor vehicle would block or at least obstruct an access to an area. It is thus possible to categorize an area of a road network which is detected by the surroundings detection system of the motor vehicle in the surroundings of the motor vehicle as a parking space which is compliant with the traffic regulations or as a parking space which is not compliant with the traffic regulations. The terms "access," "exit," and "pedestrian crossing" are understood in a broad sense in the present case. The terms "access/exit" include in particular roadway or street junctions, garage driveways, accesses for emergency vehicles, and agricultural roads. In addition, DE 10 2013 003 683 A1 provides a surroundings detection system, preferably a camera system (optical sensor) and/or a laser scanner and/or a radar sensor and/or an ultrasonic sensor, which preferably detects the surroundings data of lateral and laterally preceding surroundings of the motor vehicle. Furthermore, an evaluation system is provided which preferably includes a receiver unit for receiving surroundings data, detected by another vehicle, with the aid of car-to-car communication, and/or surroundings data, detected by a stationary traffic infrastructure unit, with the aid of car-to-infrastructure communication. This makes it possible, for example, for detected surroundings data to be transmitted to the host vehicle with the aid of C2C communication for the purpose of being used to verify and/or accelerate the process of categorizing the area via the evaluation means. DE 10 2013 003 683 A1 furthermore provides a refinement of the driver assistance system in which the instantaneous position of the motor vehicle is made available. In addition, DE 10 2013 003 683 A1 provides a selection means including a memory unit on which data for the ascertained category of the area and the position thereof are stored in order to have these evaluation results available for later use.

It is known from DE 10 2004 062 021 A1 that a road user including a device for measuring free parking spots, is equipped, for example, with six ultrasonic sensors in the front area and six ultrasonic sensors in the rear area for the purpose of measuring the parking space prior to parking and monitoring same during parking. Data are detected with the aid of the lateral sensors when driving past a free parking spot. The length of a free parking spot is computed with the aid of the free parking spot control unit. The information made available by the navigation device is used by the free parking spot control unit to evaluate the validity of the ascertained free parking spot (disregarding no parking zones, etc.). The measured free parking spots are buffered in the free parking spot control unit or in the navigation device for a certain period of time and then transmitted cumulatively as a block to the control center or the server via GSM or UMT communication links, for example.

Approaches are therefore known from the related art in which potential parking areas are categorized into usable parking areas and non-usable parking areas in order to prevent the driver from blocking accesses/exits, pedestrian crossings, etc.

SUMMARY

According to the present invention, a method for detecting illegally parked vehicles is provided, information about available parking areas and areas which are not available for parking being made available in the form of a digital parking map. The information about areas which are not available for parking includes coordinates, in particular GPS coordinates, and an expected length of the area. It is provided according to the present invention that the length of an area which is not available for parking is detected by a parking space searching vehicle and an illegally parked vehicle is detected if the detected length deviates from an expected length.

The present invention makes it possible to detect illegally parked vehicles which are parked in areas for a certain period of time in which long-term parking is not allowed (for example a courtyard entrance, a no parking zone, etc.) by measuring the length of the area to be kept clear. A deviation of this measured length from the expected length therefore indicates that an object, probably a vehicle, occupies the area which is not available for parking and therefore is parked illegally.

The present invention thus advantageously allows for illegally parked vehicles to be detected in automated form. An automated report of illegally parked vehicles, for example to regulatory authorities, including their detailed location information is thus enabled, so that traffic obstructions caused by illegally parked vehicles may be removed in an expedited manner. If a driver parks at an unauthorized spot by mistake, the driver can be instructed by a system to leave this space again.

A digital parking map is used as the basis for the method according to an example embodiment of the present invention. This parking map includes information about parking areas in which vehicles are allowed to be parked as well as about no parking areas in which parking is not allowed, for example a courtyard entrance or a no parking zone. Furthermore, this parking map also includes properties of the parking areas and no parking areas such as the length of the area, the depth of the area, the presence/lack of a curb, etc.

Preferably, each area which is not available for parking is assigned a mean value and an offset of the expected length in the digital parking map.

The method according to example embodiments of the present invention for detecting illegally parked vehicles includes in particular two methods which are based on the principle described above. Which one of the two described methods is used depends on the particular situation. A vehicle detects, when driving past once or multiple times, a considerably shorter free parking spot length than the learned and thus expected length of a no parking area. Preferably, an illegally parked vehicle is therefore detected if at least one parking space searching vehicle detects, when driving past an area which is not available for parking once or multiple times, a shorter length than the assigned mean value of the expected length minus the offset. The more often the illegally parked vehicle is verified by a measurement of a correspondingly shorter length, the safer it is to assume that this vehicle is in fact parked illegally. Particularly preferably, an illegally parked vehicle is detected if at least two parking space searching vehicles detect independently of one another, when driving past an area which is not available for parking once or multiple times, a shorter length than the assigned mean value of the expected length minus the offset.

A vehicle does not detect a free spot at the expected location when plausibly driving past a no parking area once or multiple times. Preferably, an illegally parked vehicle is therefore detected if a parking space searching vehicle does not detect a free spot when driving past an area which is not available for parking.

In an example embodiment of the method, a central processing unit and/or a regulatory authority is/are notified by the parking space searching vehicle following the detection of an illegally parked vehicle, at least the coordinates of the occupied area which is not available for parking being transmitted. It is also conceivable to directly notify the owner of an illegally parked vehicle, as soon as it has been detected, with the aid of a corresponding communication system so that the driver may remove the vehicle.

In an example embodiment of the method, a warning can be output to the driver of a parking space searching vehicle if the vehicle is parked or is to be parked in an area which is not available for parking. This protects the driver from violating the traffic law and ensures that important accesses are kept clear.

The digital parking map preferably includes information which is detected by parking space exploring vehicles which are part of traffic and which transmit this information to a central processing unit, the central processing unit incorporating this information into the digital parking map. The detected and transmitted information includes in particular a particular expected length and coordinates of areas that are not available for parking. The digital map is thus constantly updated. The parking space exploring vehicles can be at the same time parking space searching vehicles and detect, in addition to the information about the length and position of the areas which are not available for parking, up-to-date information about free and occupied parking spaces and transmit same to the central processing unit. This information can then in turn be made available to other parking space searching vehicles.

According to another aspect of the present invention, a parking guidance system for navigating a parking space searching vehicle toward a free parking space is provided, the parking guidance system being designed to carry out a method for detecting illegally parked vehicles as designed above.

BRIEF DESCRIPTION OF THE DRAWINGS

FIGS. 4a and 4b show an application of measured lengths and associated GPS coordinates according to an example embodiment of the present invention.

DETAILED DESCRIPTION

Figure 1:
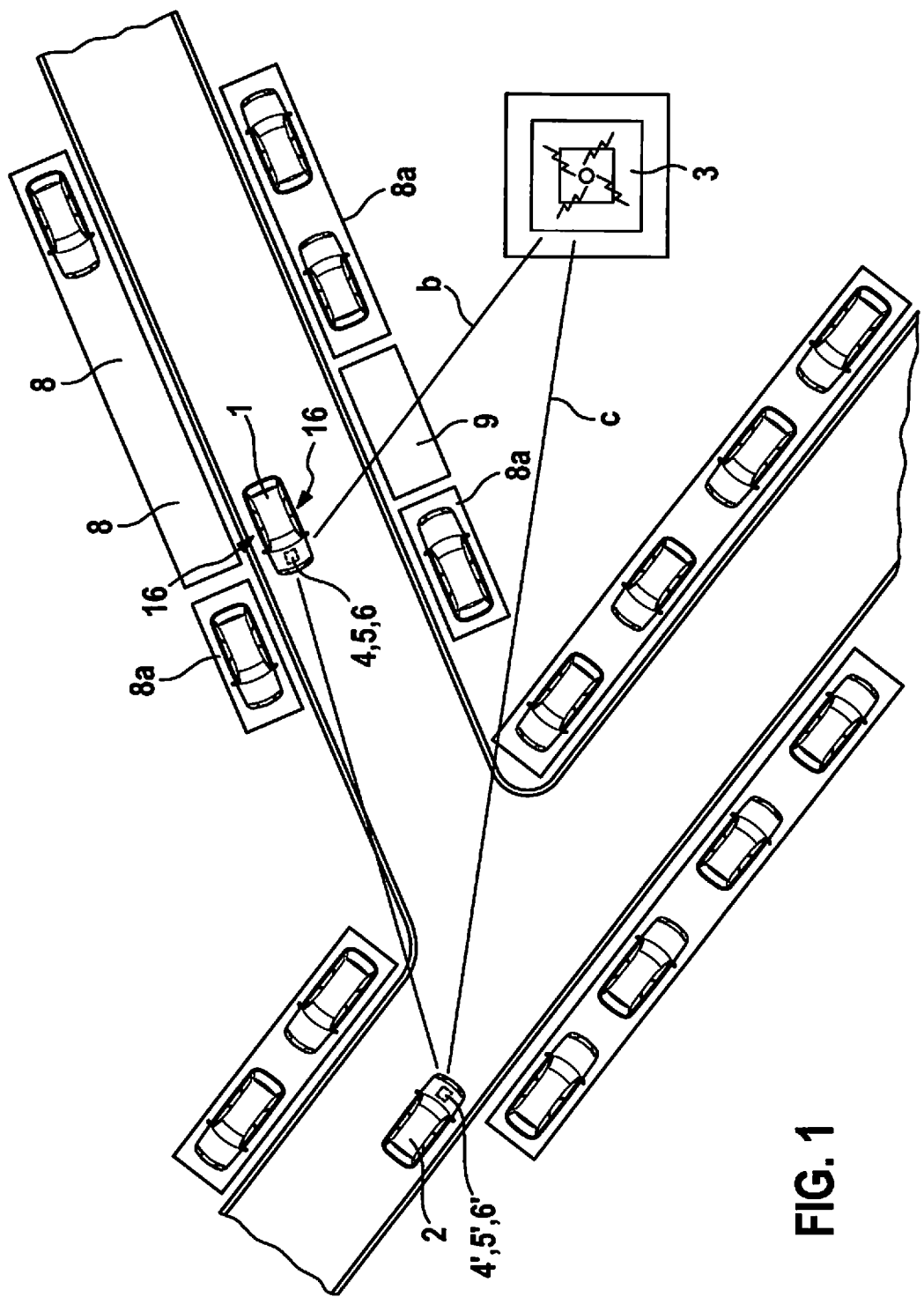
FIG. 1 shows a parking guidance system that implements a method for detecting illegally parked vehicles, according to an example embodiment of the present invention.

In the following description of the exemplary embodiments of the present invention, identical elements are denoted by the same reference numerals, and a repetitive description of these elements is dispensed with. The figures represent the subject matter of the present invention only schematically.

FIG. 1 shows a parking guidance system which implements a method according to the present invention for detecting illegally parked vehicles, reference numeral 1 identifying a parking space exploring vehicle and reference numeral 2 identifying a parking space searching vehicle. Parking space exploring vehicles 1 are equipped with a position determination device, such as a GPS (global positioning system) device or a navigation system 4, in order to be able to determine the location or position data (coordinates) of free parking spaces 8, occupied parking spaces 8a, and areas 9 which are not available for parking. Furthermore, parking space exploring vehicles 1 are equipped with surroundings sensors with the aid of which the length of a free parking space or an area 9 which is not available for parking can be determined. A communication device 5, for example in the form of a transceiver unit, is then used to transfer this information to a central processing unit 3. An area 9 which is not available for parking is then detected, for example, as such if the area is not detected as occupied even after a parking space exploring vehicle 1 drives past it multiple times at different points in time. Alternatively or additionally, information about the positions of areas 9 which are not available for parking can also be provided by external authorities, for example a municipality. It is also conceivable that certain areas are classified as areas 9 which are not available for parking only at certain times of day.

Parking space exploring vehicles 1 combined with their navigation system 4 and communication device 5 are thus used as individual sensors 16 which are able to detect and measure free parking spaces 8, occupied parking spaces 8a, and areas 9 which are not available for parking. A processing device 6 in vehicle 1 controls this method and triggers, for example, the transmission of the position data with the aid of communication device 5 upon detecting free parking space 8. The functions of navigation system 4, communication device 5, and processing device 6 are preferably combined in a single unit or device which is referred to in the following as a detection unit.

The central processing unit combines in a digital map the information transmitted to it by parking space exploring vehicles 1 about free parking spaces 8, occupied parking spaces 8a, and areas 9 which are not available for parking.

Parking space searching vehicles 2 also include a navigation system 4', a communication device 5', and a processing device 6' which are also preferably combined in a single unit or device which is referred to in the following as a navigation unit.

The detection unit and the navigation unit can naturally be combined to form a single unit. On the one hand, this vehicle can act as a sensor 16 for free parking spaces when driving past and relay this information accordingly. On the other hand, in the event that a parking space is searched for, information about free parking spaces in the vicinity can be inquired by correspondingly actuating the navigation unit in order to be able to initiate the appropriate navigation toward the free parking space.

The detection and measurement with the aid of parking space exploring vehicle 1, in particular the detection of the coordinates and the length of a free parking space 8, an occupied parking space 8a, or an area 9 which is not available for parking can take place via at least one sensor 16 on an optical basis, for example using a camera mounted on vehicle 1, and/or on a non-optical basis, for example using ultrasonic sensors.

The digital parking map or an extract therefrom can be transmitted by the central processing unit to other, parking space searching vehicles 2 for parking space navigation with the aid of an air interface, such as GSM (global system for mobile communication as the standard for digital mobile communication), WLAN (wireless local area network, for example IEEE 802.11g), or the like. Vehicle 1 ascertains, via its at least one sensor 16, free parking spaces 8 on the right-hand side and possibly also on the left-hand side when driving past. This information together with the instantaneous position is provided with a time stamp and transmitted to the central processing unit where the information is integrated into the digital parking map. A further vehicle 2 can obtain this information via central processing unit 3 via a channel 'c'.

The detection of an illegally parked vehicle according to the present invention is now explained in greater detail with reference to FIGS. 2-4 by way of example.

Figure 2:
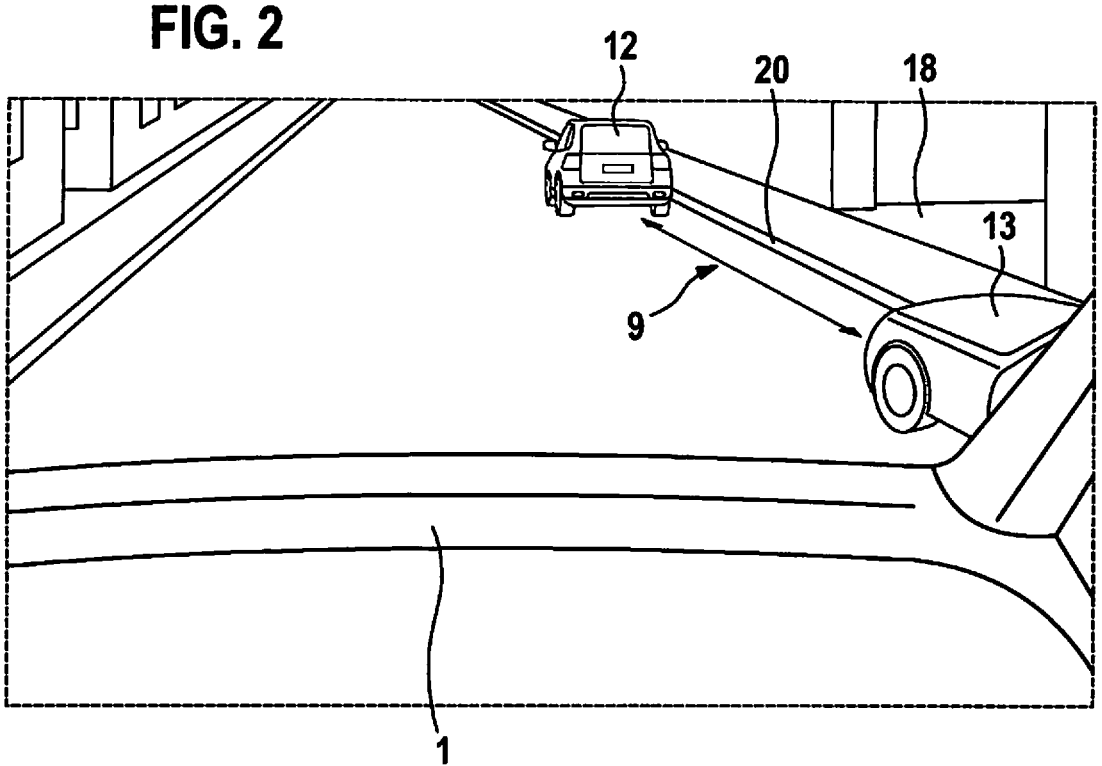
FIG. 2 shows one exemplary scene in which a free area which is not available for parking is detected.

The situation in FIG. 2 serves as a first example. Here, a courtyard entrance 18 is on the right-hand side and furthermore, two parked vehicles 12, 13 are parked in parking area 8a adjacent to the courtyard entrance. A length of area 9 between parked vehicles 12, 13 which is not available for parking is assumed to be 8 meters, by way of example. Now, if an exploring vehicle 1 including a distance-based measuring method drives past this scene multiple times and measures the length of area 9 between parked vehicles 12 and 13 every time that it drives past, measured lengths of 8 m+/− a variance result, which is due to the imprecision of the detection sensors and different parking behaviors of people. The detected position of the area, i.e., the GPS coordinates, is in general also subject to a measuring imprecision resulting from the GPS position imprecision of the vehicle.

Furthermore, it is ascertainable from the measured values that in this scene a high curb 20 which delimits area 9 is not present. In the associated parking map, the shown part of area 9 is now learned and stored in digital form as a no parking area, the length of area 9 being stored as 8 meters+/− the variance.

Figure 3:
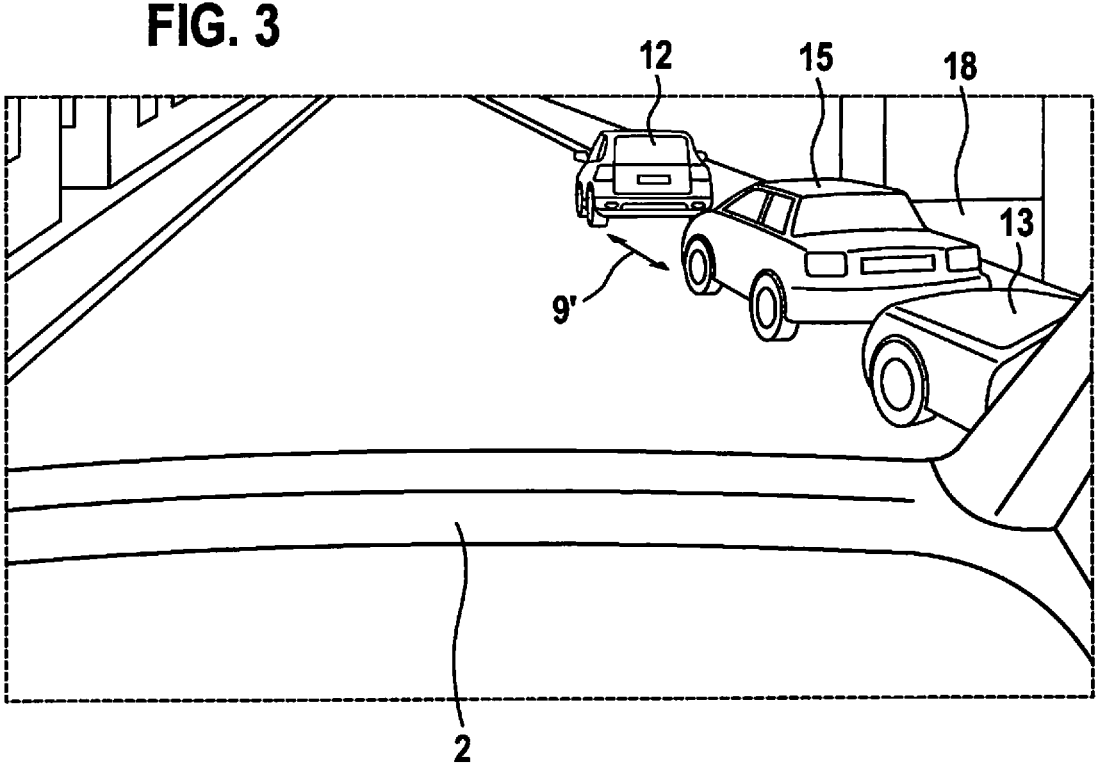
FIG. 3 shows one exemplary scene in which the area which is not available for parking from FIG. 2 is occupied by an illegally parked vehicle.

Now, if the scene changes, as illustrated in FIG. 3, and an illegally parked vehicle 15 is parked in front of the courtyard entrance, considerably shorter lengths 9' are measured by a parking space searching vehicle 2 between illegally parked vehicle 15 and vehicle 12 perked in front of vehicle 15. Apart from considerably shorter length 9', the detection sensors of vehicle 2 furthermore detect that a high curb is still not present.

FIG. 4a shows a coordinate system 50 in which the length of the free spot detected in each case is plotted against the GPS coordinates (GPS longitude and GPS latitude) for a plurality of measurements from exploring vehicles 1 driving past the courtyard entrance from FIG. 2. Two accumulations of dots are apparent. A large accumulation of dots 100 represents the measured values from the situation without the illegally parked vehicle (FIG. 2). The length values are all in the range of 8 meters (this corresponds to the expected value according to the parking map). A smaller accumulation of dots 200 represents the measured values from the situation involving the illegally parked vehicle. The measured length values are all in the range of approximately 5 meters. The two accumulations are clearly separable from one another.

The method for detecting illegally parked vehicles thus compares measured length values to the length learned from the parking map and thus expected. Now, if a certain number x of measured values is present which are smaller than the learned length minus an offset, an illegally parked vehicle is inferred according to the present invention. The offset value is preferably selected to be higher than the measurement imprecision of the used detection sensors as well as higher than the expected deviation of the measured values which results from the usually slightly different driving and/or parking behaviors of different people. An offset value is to be preferably selected higher than 3 meters. The higher the offset value, the clearer is the separation between the accumulations. Number x should preferably have at least a value of x=2 measurements, since otherwise a vehicle could also be involved, for example, which is merely leaving the courtyard entrance during a measurement. For the sake of greater reliability, additional properties of the measured values of small accumulation 200 could furthermore be compared to the values of large accumulation 100, for example to verify whether this involves the same situation and not an error in the GPS measurement. If, for example, in the case of the measurements which are assigned to an illegally parked vehicle a high curb has not been detected either, it is safer to assume that this involves the same scene and not a different scene which is geographically proximate.

Overall, the situation "illegally parked vehicle" is therefore classified with the aid of at least x=2 measurements based on a previously learned, expected length of a no parking zone at a certain location identified via GPS coordinates. The information about the expected lengths and assigned coordinates of the no parking zones is retrieved in this case from a digital parking map.

In an alternative situation, a free spot is not detected at the expected location when plausibly driving past a no parking area. A similar situation as the one described with reference to FIGS. 2 and 3 is assumed with the only difference that the courtyard entrance is only slightly longer than a typical vehicle length, for example 5 meters. If, in this case, an illegally parked vehicle 15 is parked in the free spot in front of the courtyard entrance, the distance between the parked vehicles is too small to be detected. Illegally parked vehicle 15 is still detected in this case, since a free spot is not detected at the expected location. For this purpose, it is first checked for plausibility whether the objects present in the scene during the drive past of the measuring vehicle are within sensor range $d_{max}$ (and thus were "seen" by the sensor) and also whether other limiting values of the free parking spot searching algorithm were adhered to, for example a maximum driving velocity $v_{max}$. This means, for example, that when driving past area 9, which is not available for parking, objects are detected at a distance $d<d_{max}$ (for example 2.5 m) and at a driving velocity $v<v_{max}$ (for example 55 km/h) and a free spot is not detected at the expected location, an illegally parked vehicle 15 is inferred. It is also true in this example that illegally parked vehicle 15 should preferably be verified by at least two measurements in order to guarantee a sufficient accuracy. In this example, the position (GPS coordinates) of the expected free spot is also retrieved from the digital parking map. A corresponding application of the measured values in a coordinate system 51 is illustrated in FIG. 4b. Here, an accumulation 300 of measured length values of zero or close to zero is apparent in the area of the position (represented by GPS longitude and GPS latitude). An illegally parked vehicle is inferred therefrom.

What is claimed is:

1. A method for detecting illegally parked vehicles, the method comprising:
    obtaining a digital map that identifies (a) parking areas and (b) respective coordinates and a respective expected length of an entire area that is unavailable for parking;
    detecting, by a first vehicle, a length of an unoccupied area corresponding to the area that is unavailable for parking; and
    determining presence of a second vehicle as being illegally parked within the area that is unavailable for parking responsive to the detected length deviating from the respective expected length of the entire area that is unavailable for parking.

2. The method of claim 1, wherein the first vehicle is a parking space searching vehicle, and the presence of the second vehicle as being illegally parked is determined responsive to the parking space searching vehicle not detecting a free spot when driving past the area that is unavailable for parking.

3. The method of claim 1, further comprising, responsive to the determination of the presence of the second vehicle as being illegally parked, transmitting, by the first vehicle and to at least one of a central processing unit and a regulatory authority, a report including at least the coordinates of the area that is unavailable for parking.

4. The method of claim 1, further comprising the first vehicle or a central processing unit outputting a warning to a driver of the second vehicle responsive to detection of the second vehicle being parked in the area that is unavailable for parking.

5. The method of claim 1, wherein the digital map includes information detected by parking space exploring vehicles that are part of traffic and that transmit the information to a central processing unit, the central processing unit incorporating the information into the digital map, the information including the respective coordinates and the respective expected length of the area that is unavailable for parking.

6. The method of claim 1, wherein the coordinates are GPS coordinates.

7. The method of claim 1, wherein the determining of the presence of the second vehicle as being illegally parked within the area that is unavailable for parking is responsive to the detected length being less than the respective expected length.

8. A method for detecting illegally parked vehicles, the method comprising:
    obtaining a digital map that identifies (a) parking areas and (b) respective coordinates and respective expected lengths of areas that are unavailable for parking, wherein each of the areas that is unavailable for parking is assigned a mean value of the respective expected length and an offset of the respective expected length;
    detecting, by a first vehicle, a length of an unoccupied area corresponding to one of the areas that are unavailable for parking; and
    determining presence of a second vehicle as being an illegally parked vehicle responsive to the detected length deviating from the respective expected length of the one of the areas that are unavailable for parking.

9. The method of claim 8, wherein the presence of the illegally parked vehicle is determined responsive to determining that the detected length, which is detected by the detecting driving past the one of the areas that are unavailable for parking at least once, is shorter than the assigned mean value of the expected length minus the offset.

10. A method for detecting illegally parked vehicles, the method comprising:
    obtaining a digital map that identifies (a) parking areas and (b) respective coordinates and respective expected lengths of areas that are unavailable for parking;
    detecting, independently at least once by each of at least two detecting vehicles driving past one of the areas that are unavailable for parking, a length of an area corresponding to the one of the areas that are unavailable for parking; and
    determining presence of an illegally parked vehicle responsive to each of the lengths detected by the at least two detecting vehicles being shorter than the respective expected length of the one of the areas that are unavailable for parking.

11. The method of claim 10, wherein each of the areas that is unavailable for parking is assigned a mean value of the expected length and an offset of the respective expected length.

12. The method of claim 11, wherein the lengths detected by the at least two detecting vehicles are determined to be shorter than the respective expected length of the one of the areas that are unavailable for parking when the detected lengths are each shorter than the assigned mean value of the expected length minus the offset.

13. A parking guidance system for navigating a first vehicle, which is a parking space searching vehicle, toward a free parking space, the parking guidance system comprising:
    a sensor of the first vehicle; and
    a processor of the first vehicle;
    wherein:
        the processor is configured to obtain a digital map that identifies (a) parking areas and (b) respective coordinates and a respective expected length of an entire area that is unavailable for parking;

the sensor is configured to detect a length of an unoccupied area corresponding to the area that is unavailable for parking;

the processor is configured to determine a presence of a second vehicle as being illegally parked within the area that is unavailable for parking responsive to the detected length deviating from the respective expected length of the entire area that is unavailable for parking; and the processor is configured to provide output based on the determined presence of the second vehicle as being illegally parked.

14. A method for detecting illegally parked vehicles based on a digital map that identifies (a) parking areas and (b) respective coordinates and respective expected lengths of areas that are unavailable for parking, the method comprising:

obtaining, by a central processor, a respective indication from each of at least two detecting vehicles that indicates that the respective detecting vehicle has, at least once while the respective detecting vehicle was driving past one of the areas that are unavailable for parking, independently detected a length of an area corresponding to the one of the areas that are unavailable for parking being shorter than the respective expected length of the one of the areas that unavailable for parking; and determining, by the central processor and responsive to the respective indications from the each of the at least two detecting vehicles, that another vehicle, other than the at least two detecting vehicles, is present as an illegally parked vehicle in the one of the areas that unavailable for parking.

\* \* \* \* \*